(12) United States Patent
Nusier et al.

(10) Patent No.: US 10,632,951 B2
(45) Date of Patent: Apr. 28, 2020

(54) IMPACT ABSORBING SYSTEM

(71) Applicant: Ford Global Technologies, LLC, Dearborn, MI (US)

(72) Inventors: Saied Nusier, Canton, MI (US); Mohammed Omar Faruque, Ann Arbor, MI (US); Mohamed Ridha Baccouche, Ann Arbor, MI (US); S. M. Iskander Farooq, Novi, MI (US); Dean M. Jaradi, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 199 days.

(21) Appl. No.: 15/458,328

(22) Filed: Mar. 14, 2017

(65) Prior Publication Data
US 2018/0265027 A1  Sep. 20, 2018

(51) Int. Cl.
| | |
|---|---|
| *B60R 21/015* | (2006.01) |
| *B60R 21/02* | (2006.01) |
| *B62D 25/02* | (2006.01) |
| *B62D 25/20* | (2006.01) |
| *B60R 21/0136* | (2006.01) |
| *B60R 21/16* | (2006.01) |
| *B60R 21/01* | (2006.01) |

(52) U.S. Cl.
CPC ........ *B60R 21/026* (2013.01); *B60R 21/0136* (2013.01); *B60R 21/16* (2013.01); *B62D 25/025* (2013.01); *B62D 25/20* (2013.01); *B60R 2021/01211* (2013.01); *B60R 2021/01252* (2013.01); *B60R 2021/01286* (2013.01); *B60R 2021/0273* (2013.01)

(58) Field of Classification Search
CPC .. B62D 25/025; B62D 25/20; B60R 21/0136; B60R 21/16; B60R 21/026; B60R 2021/0273; B60R 2021/01286; B60R 2021/01211; B60R 2021/01252
USPC ........................ 280/728.2, 730.1, 730.2, 735
See application file for complete search history.

(56) References Cited

U.S. PATENT DOCUMENTS

| | | | |
|---|---|---|---|
| 5,149,165 A * | 9/1992 | Woolley | B60N 2/4235 180/274 |
| 6,302,481 B1 * | 10/2001 | Swann | B60N 2/067 297/216.1 |
| 6,540,280 B2 | 4/2003 | Tamura et al. | |
| 6,764,086 B2 * | 7/2004 | Gnauert | B62D 21/00 180/89.1 |
| 7,243,983 B2 | 7/2007 | Rashidy et al. | |
| 7,819,465 B2 | 10/2010 | Elliott et al. | |
| 8,573,633 B2 * | 11/2013 | Kino | B60N 2/42763 280/728.2 |
| 9,902,363 B2 * | 2/2018 | Nagasawa | B60R 21/231 |

(Continued)

FOREIGN PATENT DOCUMENTS

| | | |
|---|---|---|
| FR | 2869009 | 10/2005 |
| WO | WO 2005108191 | 11/2005 |

*Primary Examiner* — Toan C To
(74) *Attorney, Agent, or Firm* — David Coppiellie; Bejin Bieneman PLC

(57) ABSTRACT

An impact absorbing system includes a vehicle floor, a rocker, and a reinforcement member. The rocker is disposed below the vehicle floor. The reinforcement member is supported on the rocker. The reinforcement member is deployable from an undeployed position beneath the vehicle floor to a deployed position above the vehicle floor.

19 Claims, 14 Drawing Sheets

(56) References Cited

U.S. PATENT DOCUMENTS

| | | | |
|---|---|---|---|
| 2002/0130528 A1* | 9/2002 | Mans | B60N 2/4214 |
| | | | 296/68.1 |
| 2005/0127645 A1* | 6/2005 | Smith | B60N 2/015 |
| | | | 280/730.2 |
| 2007/0187992 A1 | 8/2007 | Brockhoff | |
| 2007/0205626 A1* | 9/2007 | Ohtsubo | B60N 2/0224 |
| | | | 296/75 |
| 2008/0001446 A1* | 1/2008 | Suzuki | B60R 21/207 |
| | | | 297/216.1 |
| 2013/0082457 A1* | 4/2013 | Hashido | B60R 21/207 |
| | | | 280/730.1 |
| 2014/0291973 A1* | 10/2014 | Nukaya | B60R 21/207 |
| | | | 280/730.1 |

* cited by examiner

IMPACT ABSORBING SYSTEM

BACKGROUND

Vehicles may include multiple pillars as part of a vehicle body. The pillars may be disposed throughout the vehicle, e.g., at a front of the vehicle (e.g., an "A-pillar"), at a rear of the vehicle (e.g., a "C-pillar"), and in the middle of the vehicle (e.g., a "B-pillar"). The pillars may absorb energy during a vehicle impact. For example, in a side impact, the B-pillar may absorb energy from the impact to vehicle doors toward a vehicle cabin.

DETAILED DESCRIPTION

Figure 1:
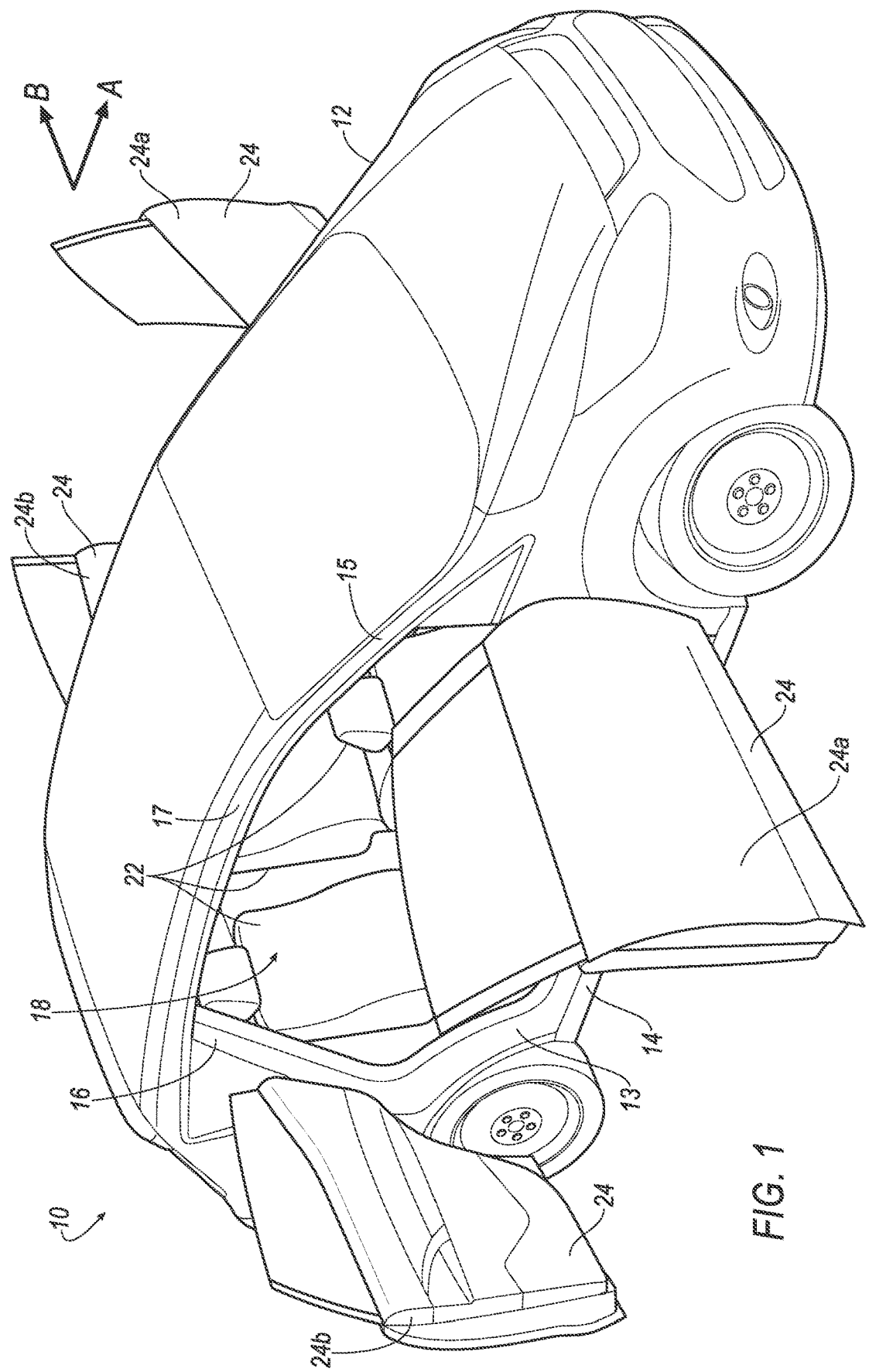
FIG. 1 is a perspective view of a vehicle with vehicle doors open.

An impact absorbing system includes, a vehicle floor, a rocker disposed below the vehicle floor, and a reinforcement member. The reinforcement member is supported on the rocker and deployable from an undeployed position beneath the vehicle floor to a deployed position above the vehicle floor.

The impact absorbing system may include an airbag disposed beneath the reinforcement member and inflatable to an inflated position. The airbag may be positioned to move the reinforcement member to the deployed position when the airbag inflates to the inflated position.

The impact absorbing system may include a second reinforcement member supported by the rocker and deployable from an undeployed position beneath the vehicle floor to a deployed position above the vehicle floor. The impact absorbing system may include a slider fixed to the reinforcement member, wherein the second reinforcement member may include a slot and the slider may be slidably connected to the slot. The second reinforcement member may be telescopically received in the reinforcement member in the undeployed position. The reinforcement may includes a chamber tapering from a first end to a second end, wherein the second reinforcement may telescopically extend from the second end in the deployed position. The impact absorbing system may include a third reinforcement member telescopically received in the second reinforcement member in the undeployed position.

The impact absorbing system may include a support member rotatably connected to the reinforcement member and a groove in the vehicle floor, wherein the support member may be slidably connected to the groove. The impact absorbing system may include a post movable from an undeployed position below the groove to a deployed position above the groove. When the reinforcement member is in the deployed position and the post is in the deployed position, the support member may be fixed between the reinforcement member and the post.

The reinforcement member may taper from a first edge of the reinforcement member to a second edge of the reinforcement member.

The impact absorbing system may include a vehicle roof and a catch connected to the vehicle roof. The reinforcement member may be spaced from the catch in the undeployed position and may be engaged with the catch in the deployed position.

The reinforcement member may be rotatably connected to the rocker.

The impact absorbing system may include an actuator designed to move the reinforcement member to the deployed position.

The impact absorbing system may include a floor pan connected to the rocker. The reinforcement member may be disposed between the floor pan and the vehicle floor in the undeployed position.

An impact absorbing system may include an impact sensor, a rocker, a reinforcement member supported by the rocker and deployable from an undeployed position to a deployed position, and an actuator in communication with the impact sensor. The actuator may be programmed to deploy the reinforcement member when the impact sensor detects an impact. The actuator may be programmed to inflate an airbag.

With reference to the Figures, wherein like numerals indicate like parts throughout the several views, the impact absorbing system 10, 10', 10" includes the vehicle floor 19, the rocker 14 disposed below the vehicle floor 19, and the reinforcement member 21, 62, 96 supported on the rocker 14. The reinforcement member 21, 62, 96 is deployable from the undeployed position beneath the vehicle floor 19 to the deployed position above the vehicle floor 19.

The reinforcement member 21 may absorb impact energy from a side impact of the vehicle 12. When the vehicle 12 lacks a B-pillar, the reinforcement member 21, 62, 96 may absorb the impact energy that the B-pillar may have absorbed. Thus, the vehicle 12 can be constructed without the B-pillar while absorbing the impact energy during the side impact.

The vehicle 12 may be any suitable type of vehicle 12, e.g., an automobile, including a sedan, a pick-up truck, a sport-utility vehicle, etc. As set forth above, the vehicle 12 may be an autonomous vehicle 12. For example, the vehicle 12 may have a computer that may control the operations of the vehicle 12 in an autonomous mode, a semi-autonomous mode, or a non-autonomous mode. For purposes of this disclosure, an autonomous mode is defined as one in which each of vehicle propulsion, braking, and steering are controlled by the computer; in a semi-autonomous mode the computer controls one or two of vehicles propulsion, braking, and steering; in a non-autonomous mode, a human operator controls the vehicle propulsion, braking, and steering.

The vehicle 12 includes a body 13. The body 13 includes a rocker 14, a forward pillar 15, and a rearward pillar 16. The body 13 may include a roof beam 17. As shown in the Figures, the body 13 may have a unibody construction, i.e., a unitary-body construction. In the unibody construction, the body 13, e.g., rockers 14, serves as the vehicle frame, and the body 13 (including the rockers 14, the pillars 15, 16, roof beams 17, etc.) is unitary, i.e., a continuous one-piece unit. As another example not shown in the Figures, the body 13 and a frame of the vehicle may have a body-on-frame construction (also referred to as a cab-on-frame construction). In other words, the body 13 and frame are separate components, i.e., are modular, and the body 13 is supported on and affixed to the frame. Alternatively, the body 13 and frame may have any suitable construction. The body 13 and/or the frame may be formed of any suitable material, for example, steel, aluminum, etc.

The vehicle 12 includes a left side and a right side spaced from each other along the cross-vehicle direction. The left side and the right side may each include one rocker 14, one forward pillar 15, one rearward pillar 16, and doors 24. Common numerals are used to identify common features of the left side and the right side. The left side and the right side may be mirror images of each other about a longitudinal axis A of the vehicle 12, or at least may include several features that are mirror images about the longitudinal axis A.

The body 13 defines a door opening 18 between the forward pillar 15 and the rearward pillar 16, and between the rocker 14 and the roof beam 17. The forward pillar 15 and the rearward pillar 16 are disposed on opposite sides of the door opening. For example, the forward pillar 15 may be referred to as an A-pillar 15. The rearward pillar 16 may be referred to as a C-pillar 16 (and the body 13 does not include a pillar between the forward pillar 15 and the rearward pillar 16 typically referred to as a B-pillar).

The door opening 18 extends continuously from the forward pillar 15 to the rearward pillar 16, and extends continuously from the rocker 14 to the roof beam. The vehicle structure may assist with the ingress and/or egress of the occupant through the door opening 18 because the door opening 18 extends continuously from the forward pillar 15 to the rearward pillar 16. The increased size of the door opening 18, for example, may be useful in an autonomous vehicle 12.

The vehicle 12 may include a vehicle cabin 20, as shown in FIGS. 1-3, 6-8, and 10-13. The vehicle cabin 20 may define a space where a vehicle occupant may ride in the vehicle 12. The vehicle cabin 20 may include a plurality of vehicle seats 22 on which the vehicle occupant may sit. The impact absorbing system 10, 10', 10" may deploy into the vehicle cabin 20.

As set forth above, the door 24 is supported by the body 13 of the vehicle 12. Specifically, the vehicle 12 includes a plurality of doors 24 supported by the body 13. The vehicle may include a front door 24a and a rear door 24b. The front door 24a and the rear door 24b are adjacent to each other in the closed position. The front door 24a and the rear door 24b may abut each other between the forward pillar 15 and the rearward pillar 16 when the front door 24a and the rear door 24b are in the closed position. The reinforcement member 21 may be disposed between the vehicle doors 24 to absorb the impact energy during the vehicle impact.

Both the right side and the left side of the vehicle may include a front door 24a and a rear door 24b. The vehicle 12, alternatively, may have any suitable number of doors 24. Common numerals are used to identify common features of the doors 24.

The doors 24 are moveable relative to the body 13 between a closed position and an open position. Each door 24 may be moveable between the open and closed positions independently of each other. In other words, any one of the doors 24 may be open or closed regardless of the opposition of the other doors 24. The rockers 14 are below the doors 24 when the doors 24 are in the closed position. When the doors 24 are in the closed position, the doors 24 retain occupants in the vehicle. When the doors 24 are in the open position, the doors 24 allow occupant ingress and egress.

The doors 24 may be hinged to the body 13. In other words, a hinge (not numbered) may be between each door 24 and the body 13. The front doors 24a may be hinged to the forward pillars 15, and the rear doors 24b may be hinged to the rearward pillars 16.

The vehicle 12 includes the vehicle floor 19, as shown in FIGS. 1-3, 6-8, and 10-13. The vehicle floor 19 may support the vehicle occupant when the vehicle occupant is in the vehicle cabin 20. The vehicle floor 19 may thus be exposed to the vehicle cabin 20. The vehicle floor 19 may be, e.g., a fabric layer such as carpet, a polymer layer, etc. As shown in FIGS. 1-12, the reinforcement member 21 deploys from the undeployed position beneath the vehicle floor 19 to the deployed position above the vehicle floor 19.

The vehicle may include a floor pan 26, as shown in FIGS. 3, 6-7, and 10-12. The floor pan 26 may be disposed below the vehicle floor 19. The floor pan 26 may support the vehicle floor 19. The floor pan 26 may be constructed of a metal, e.g., a steel alloy, an aluminum alloy, etc. As described below, the reinforcement member 21, 62, 96 may be disposed beneath the floor pan 26.

The body of the vehicle 12 may include the vehicle roof 28, as shown in FIGS. 3, 6-7, 10, and 12. The vehicle roof 28 may cover the vehicle cabin 20. The vehicle roof 28 may extend through an interior of the vehicle 12 along the roof beams 17 and may be attached to the vehicle frame (not shown). As described below and shown in FIG. 7, the vehicle roof 28 may position the reinforcement member 62 to absorb the impact energy during the side impact. In a rollover scenario, the reinforcement member 21, 62, 96 may be designed to absorb energy from the vehicle roof 28.

As shown in FIGS. 1-4 and 6-12. The rocker 14 may extend along a length of the vehicle in a longitudinal direction. The rocker 14 may be disposed below the floor pan 26, as shown in FIGS. 4, 7-8, and 10-13. The rocker 14 may be connected to the floor pan 26. Thus, the rocker 14 may support the floor pan 26. As described below, the rocker 14 supports the reinforcement member 21, 62, 96.

As shown in FIGS. 1-3, 6-8, 10-11, and 13 the vehicle 12 may define a vehicle longitudinal axis A and a vehicle lateral axis B. The vehicle longitudinal axis A may be an axis that extends from a front end of the vehicle 12 to a rear end of the vehicle 12. The vehicle lateral axis B may be an axis that extends perpendicular to the vehicle longitudinal axis A and may extend from a driver's side of the vehicle 12 to a passenger's side of the vehicle 12.

Figure 5A:
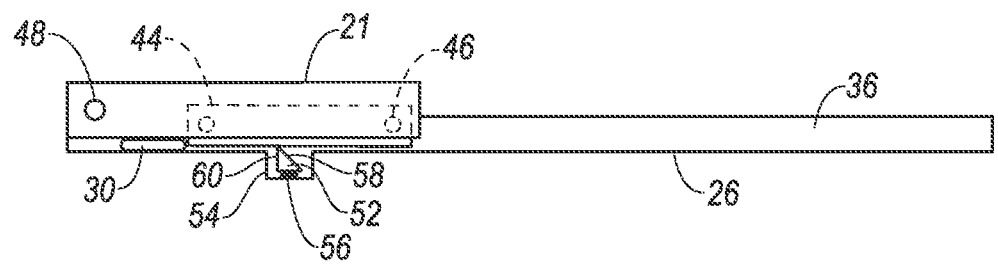
FIGS. 5A-5C illustrate the reinforcement member deploying from the undeployed position to the deployed position.
Figure 5B:
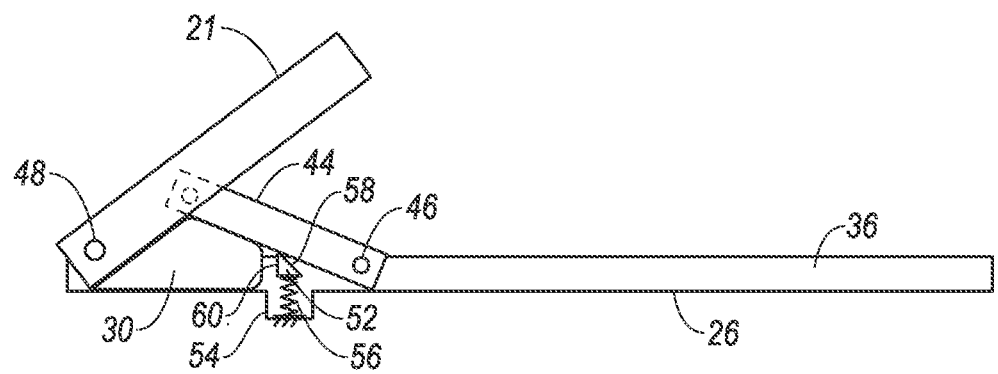
Figure 5C:
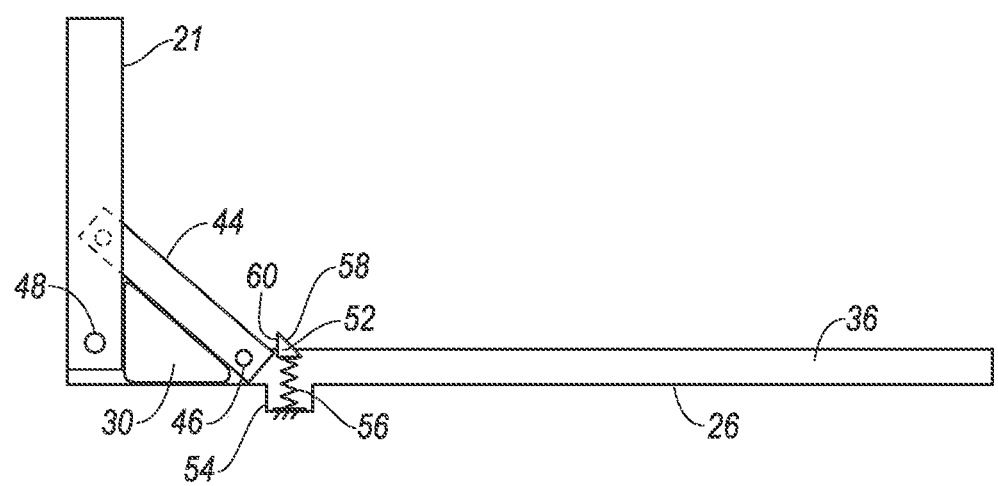
Figure 6:
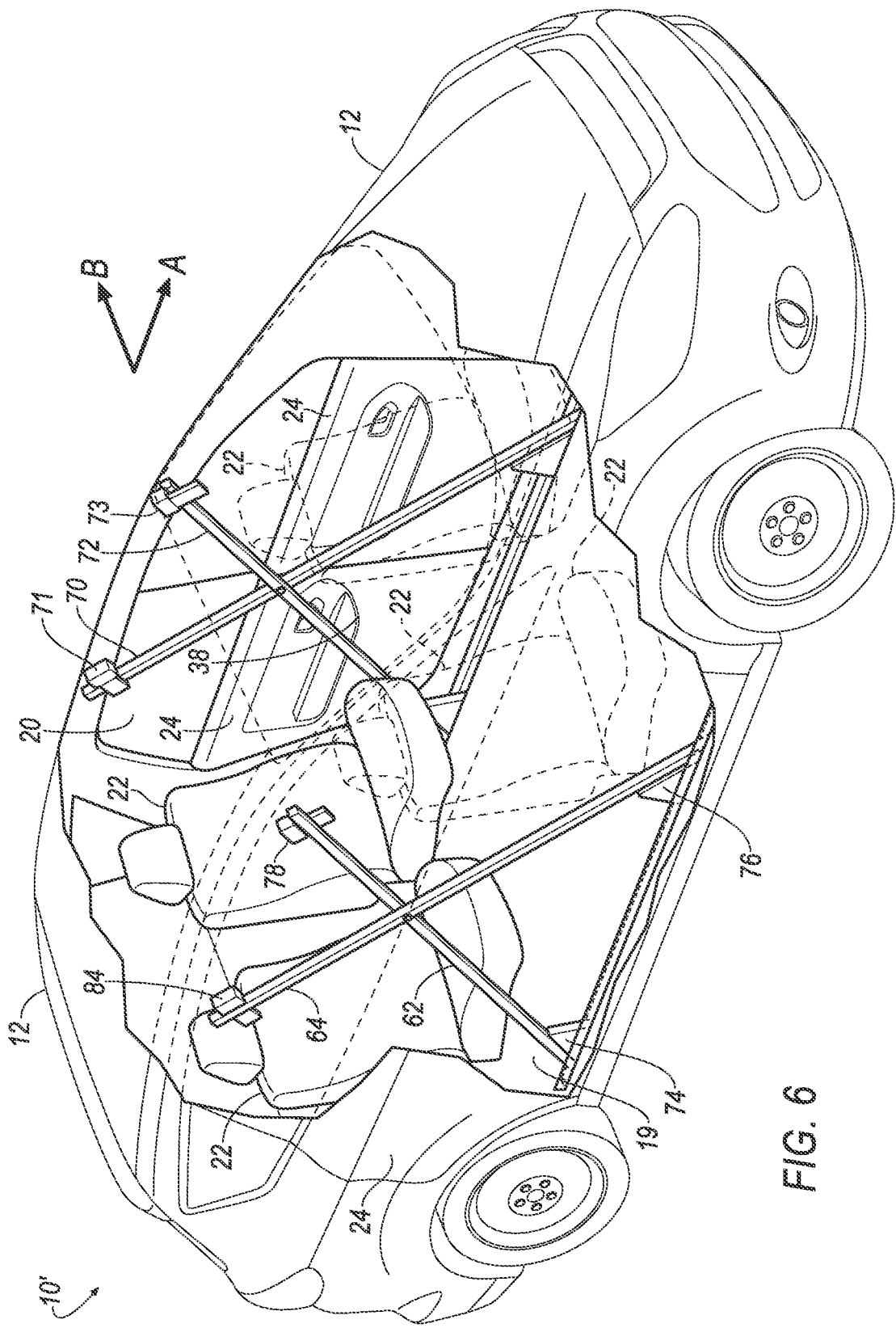
FIG. 6 is a perspective view of a vehicle including a second embodiment of the impact absorbing system.
Figure 7:
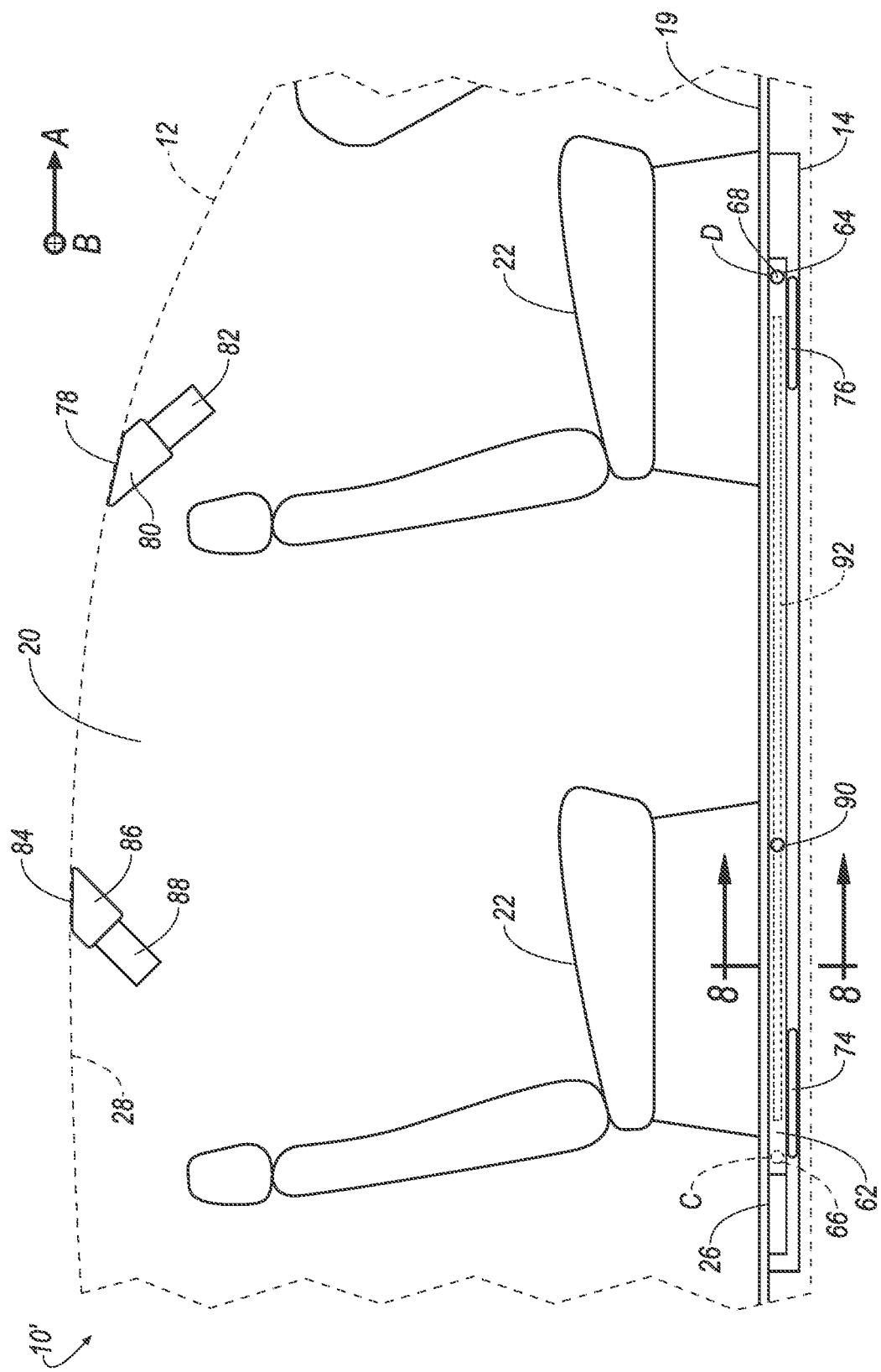
FIG. 7 is a side view of the vehicle with the second embodiment of the impact absorbing system with the reinforcement member in the undeployed position.
Figure 9:
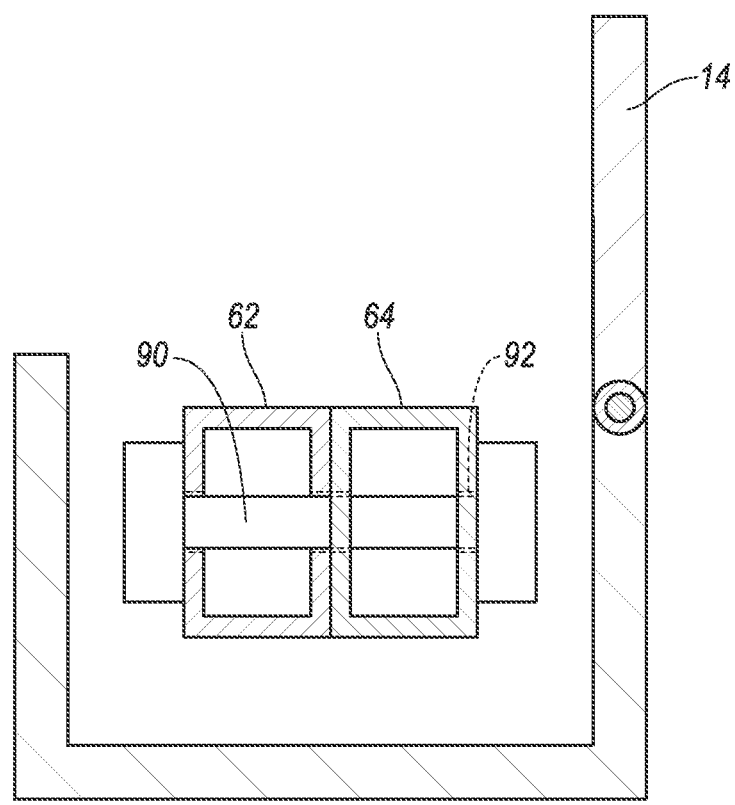
FIG. 9 is a cross-sectional view of the second embodiment of the impact absorbing system.
Figure 10:
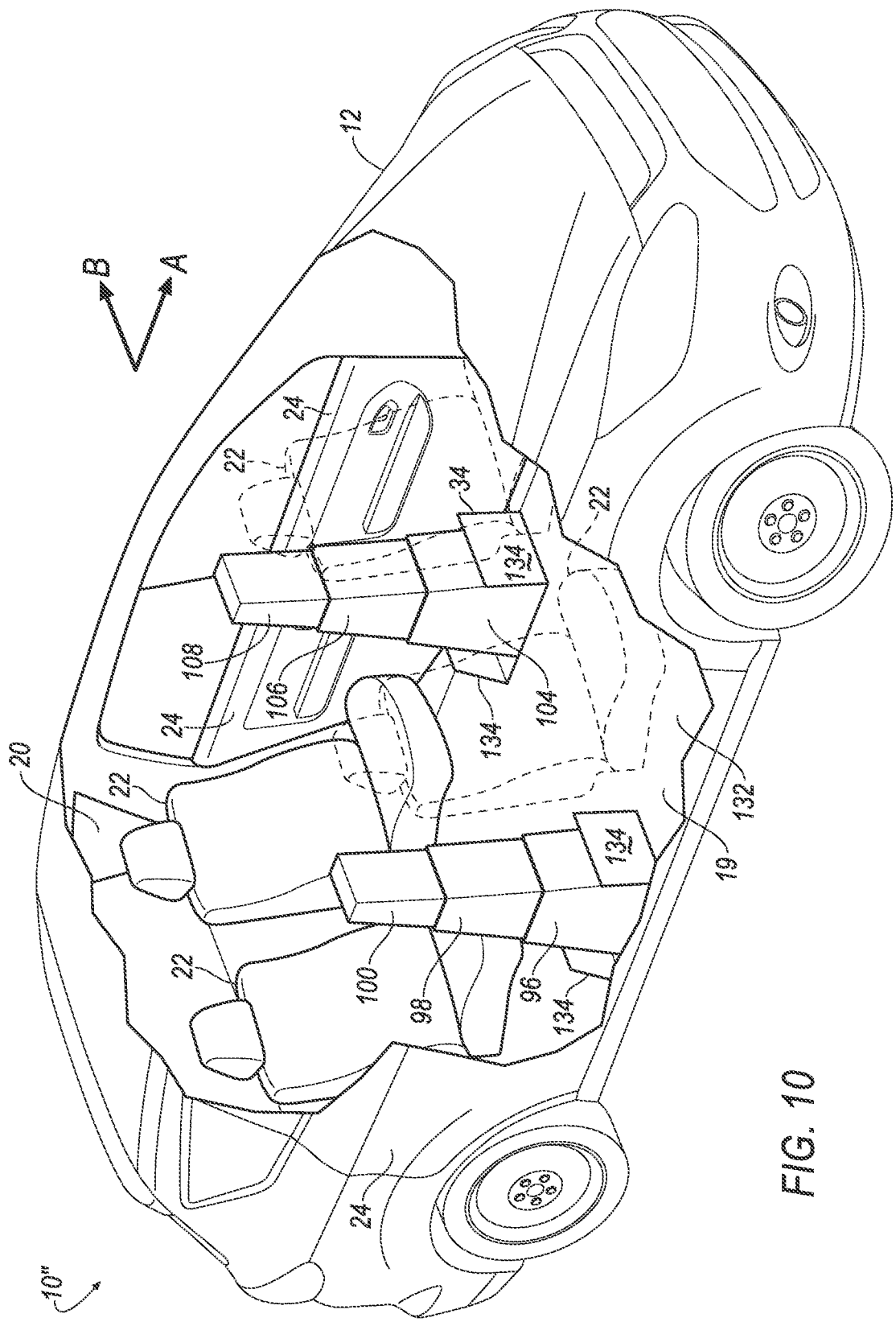
FIG. 10 is a perspective view of a vehicle including a third embodiment of the impact absorbing system.
Figure 11:
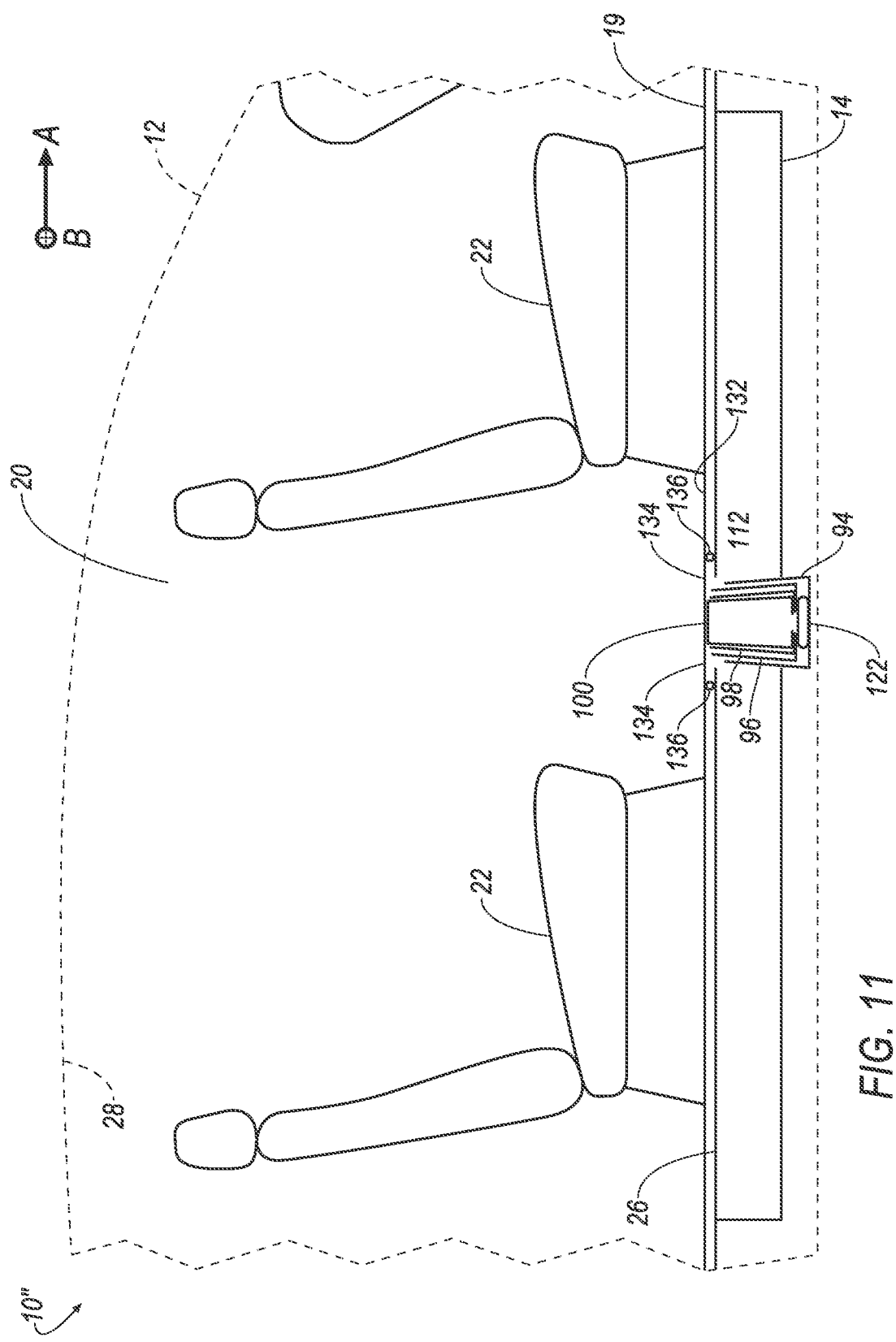
FIG. 11 is a side view of the third embodiment of the impact absorbing system with the reinforcement member in the undeployed position.

The impact absorbing system 10, 10', 10" includes the reinforcement member 21, 62, 96 as shown in FIGS. 2-13. The reinforcement member 21 may absorb energy during the side impact. The rocker 14 supports the reinforcement member 21. The reinforcement member 21 is deployable from an undeployed position beneath the vehicle floor 19 to a deployed position above the vehicle floor 19. The reinforcement member 21, 62, 96 may be disposed between the floor pan 26 and the vehicle floor 19 in the undeployed position, as shown in FIGS. 7 and 11. The reinforcement member 21, 62 may be rotatably connected to the rocker 14, as shown in FIGS. 3-5C and 6-7, with a rotator 48, 66 e.g., a hinge, a pin, etc.

The impact absorbing system 10, 10' may include an airbag 30, 74. The airbag 30, 74 may be disposed beneath the reinforcement member 21, 62, as shown in FIGS. 5A-5C and 7-9. The airbag 30, 74 may be inflatable from an uninflated position to an inflated position. The airbag 30, 74 may be positioned to move the reinforcement member 21, 62 to the deployed position when the airbag 30, 74 inflates to the inflated position, as shown in FIGS. 5A-5C and 7-9. The airbag 30, 74 may be in fluid communication with an actuator 122, as described below.

Figure 3:
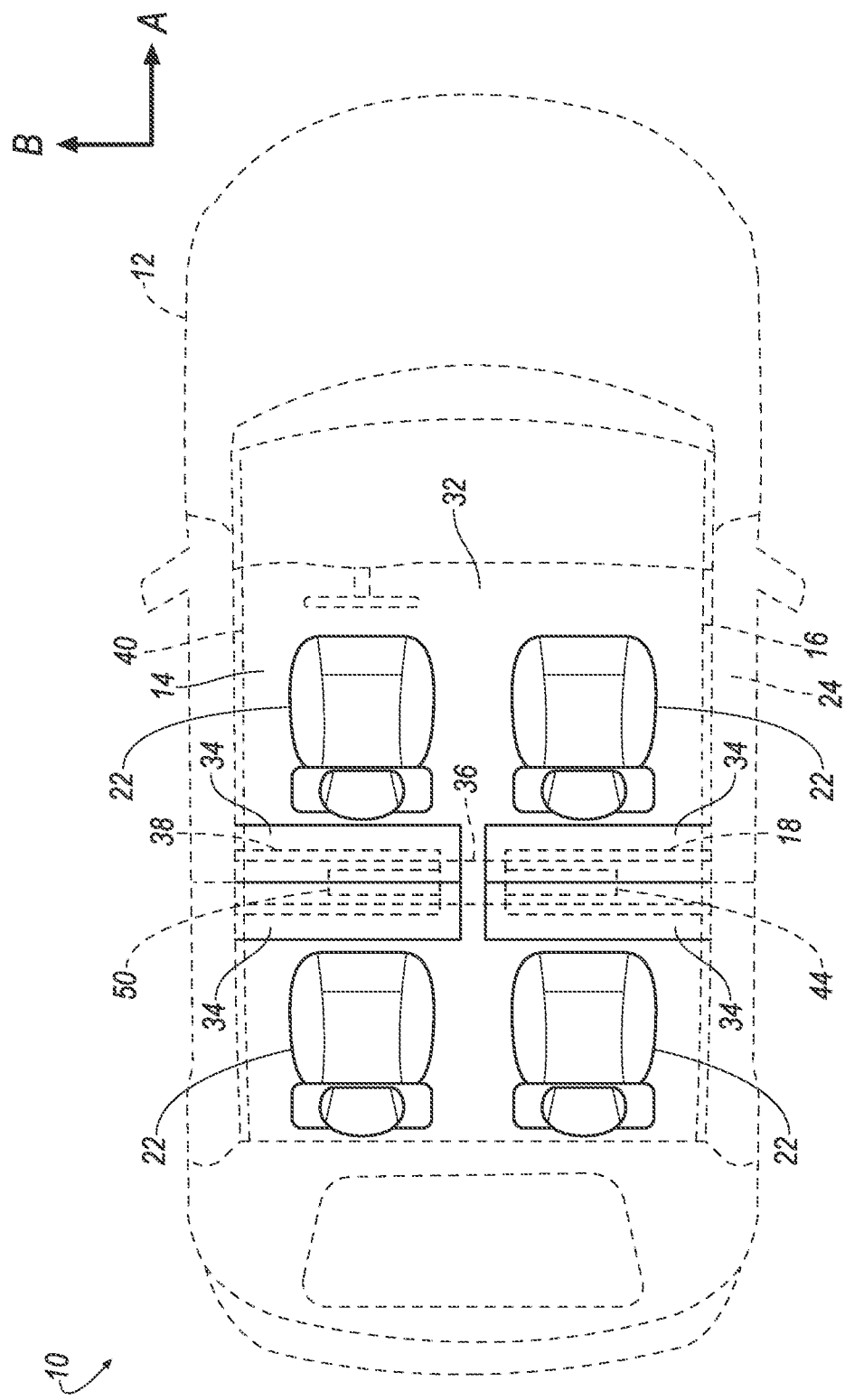
FIG. 3 is a plan view of the impact absorbing system with the reinforcement member in an undeployed position.
Figure 4:
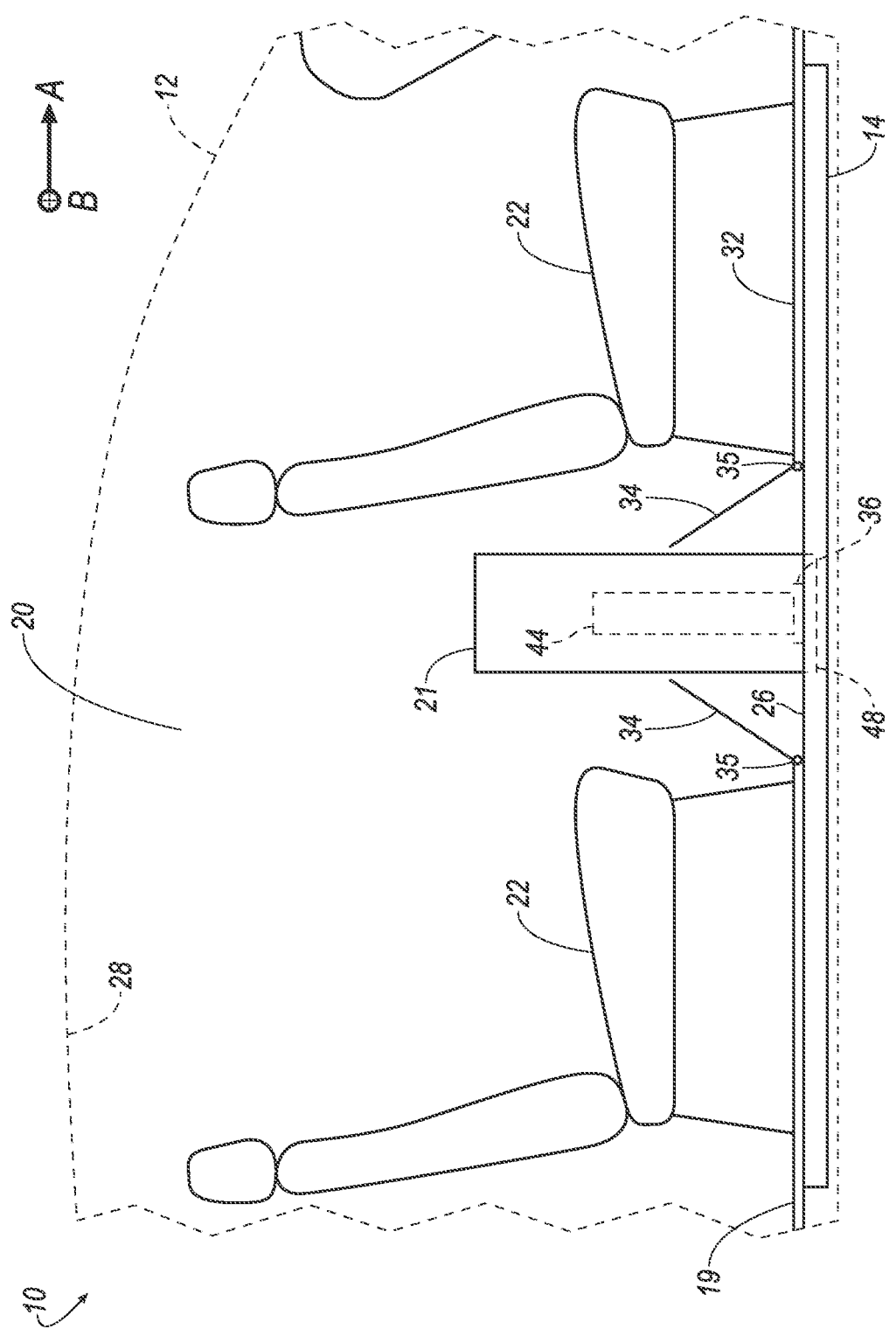
FIG. 4 is a side view of the impact absorbing system with the reinforcement member in the deployed position.

FIGS. 2-5C illustrate an embodiment of the impact absorbing system 10 in the vehicle 12. The reinforcement member 21 may be rotatable from the undeployed position to the deployed position to absorb energy during the impact, as shown in FIGS. 5A-5C. When the vehicle 12 lacks the B-pillar, the reinforcement member 21 may absorb the impact energy during the side impact.

Figure 2:
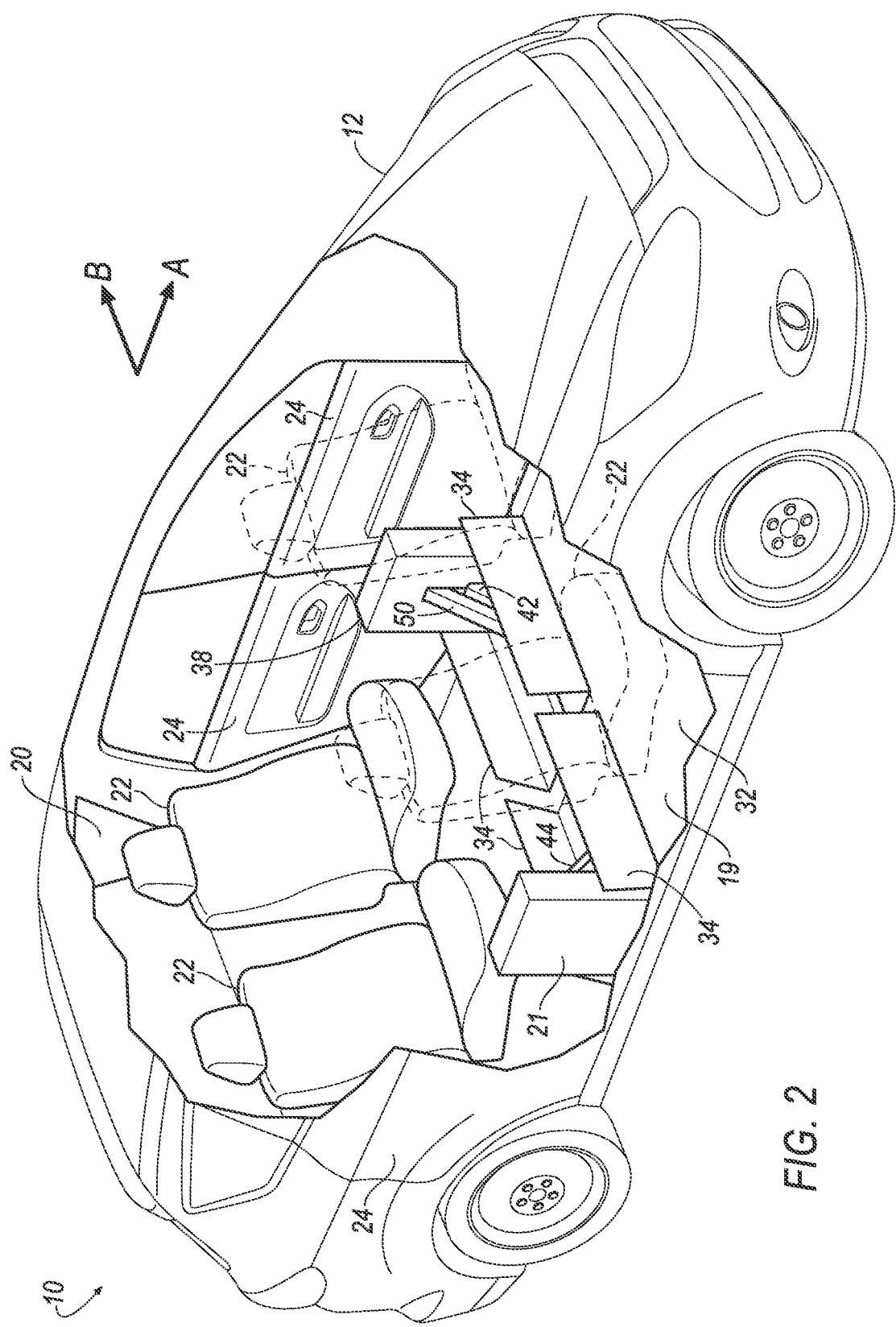
FIG. 2 is a perspective view of the vehicle with an impact absorbing system having a reinforcement member in a deployed position.

As shown in FIGS. 2-4, the vehicle floor 19 may include a main panel 32 and a plurality of cover panels 34. The main panel 32 may support the legs of the occupant during operation of the vehicle 12. The cover panels 34 may be rotatably connected to the main panel 32 with a rotator 35, e.g., a hinge, as shown in FIG. 4. The cover panels 34 may be disposed above the reinforcement member 21 in the undeployed position, as shown in FIG. 3. When the reinforcement member 21 deploys to the deployed position, the reinforcement member 21 may push against the cover panels 34, rotating the cover panels 34 away from the reinforcement member 21 and allowing the reinforcement member 21 to move above the cover panels 34 and the main panel 32 to the deployed position.

The floor pan 26 may define a groove 36, as shown in FIGS. 3-5C. The groove 36 may be a depressed portion of the floor pan 26 extending from one of the vehicle doors 24 to another of the vehicle doors 24 along the vehicle lateral axis B, as shown in FIG. 3. The groove 36 may allow the reinforcement member 21 to deploy to the deployed position, as shown in FIGS. 5A-5C and described below.

The impact absorbing system 10 may include a second reinforcement member 38, as shown in FIGS. 2-3. The second reinforcement member 38 may be supported by a second rocker 40, as shown in FIG. 3. The second reinforcement member 38 may be deployable from an undeployed position beneath the vehicle floor 19 to a deployed position above the vehicle floor 19. As shown in FIG. 2, the second reinforcement member 38 may absorb energy from an impact on an opposing side of the vehicle 12 relative to the reinforcement member 21. Thus, the reinforcement member 21 and the second reinforcement member 38 may absorb energy from the impact on either or both sides of the vehicle 12. A second airbag 42 may deploy the second reinforcement member 38 from the undeployed position to the deployed position.

The impact absorbing system 10 may include a support member 44, as shown in FIGS. 2-5C. The support member 44 may be rotatably connected to the reinforcement member 21 with, e.g., a pin, a hinge, etc. The support member 44 may be slidably connected to the groove 36. For example, as shown in FIGS. 5A-5C, the support member 44 may be connected to the groove 36 with a sliding mechanism 46, e.g., a pin, a bearing, a wheel, etc. The support member 44 may support the reinforcement member 21 in the deployed position, absorbing impact energy from the reinforcement member 21. The support member 44 may be disposed in the groove 36 in the undeployed position, as shown in FIG. 5A. The second reinforcement member 38 may be connected to a second support member 50, as shown in FIGS. 2-3.

The impact absorbing system 10 may include a post 52. The post 52 may be installed in the groove 36, as shown in FIGS. 5A-5C. That is, the post 52 may be attached to the floor pan 26 below the vehicle floor 19 and may extend up in the groove 36. For example, the post 52 may be attached to an indentation 54 in the floor pan 26. The post 52 may be movable from an undeployed position below the groove 36 to a deployed position above the groove 36. That is, the post 52 may be attached to the floor pan 26 with an axial attachment 56, e.g., a spring. When the axial attachment 56 is depressed, e.g., when a force is applied, the post 52 may move to the undeployed position below the groove 36, as shown in FIG. 5A. When the axial attachment 56 is released, e.g., when the force is no longer applied, the post 52 may move to the deployed position, as shown in FIGS. 5B-5C.

When the reinforcement member 21 deploys to the deployed position, the support member 44 may depress the post 52 to the undeployed position, as shown in FIG. 5B. That is, as shown in FIGS. 5A-5C, the post 52 may have an angled side 58 and a straight side 60. As the support member 44 slidably moves along the groove 36, the support member 44 may push on the angled side 58, depressing the axial attachment 56 and moving the post 52 to the undeployed position. Once the support member 44 moves past the post 52, the axial attachment 56 pushes the post 52 up through the groove 36 to the deployed position. At this point, the support member 44 may apply a force to the straight side 60, preventing the support member 44 from applying an axial force to the axial attachment 56 and preventing the post 52 from moving to the undeployed position. Thus, when the reinforcement member 21 is in the deployed position and the post 52 is in the deployed position, the support member 44 may be fixed between the reinforcement member 21 and the post 52. As a result, the reinforcement member 21 is prevented from sliding back along the groove 36 when impact energy is applied to the reinforcement member 21, and the impact energy is transferred, at least in part, from the reinforcement member 21 through the support member 44 to the straight side 60 of the post 52.

FIGS. 6-9 illustrate another embodiment of the impact absorbing system 10'. A reinforcement member 62 deploys along the vehicle doors 24 and stops at the vehicle roof 28. By rotating along the vehicle doors 24, the reinforcement member 62 may be positioned to absorb impact energy from the side impact.

Figure 8:
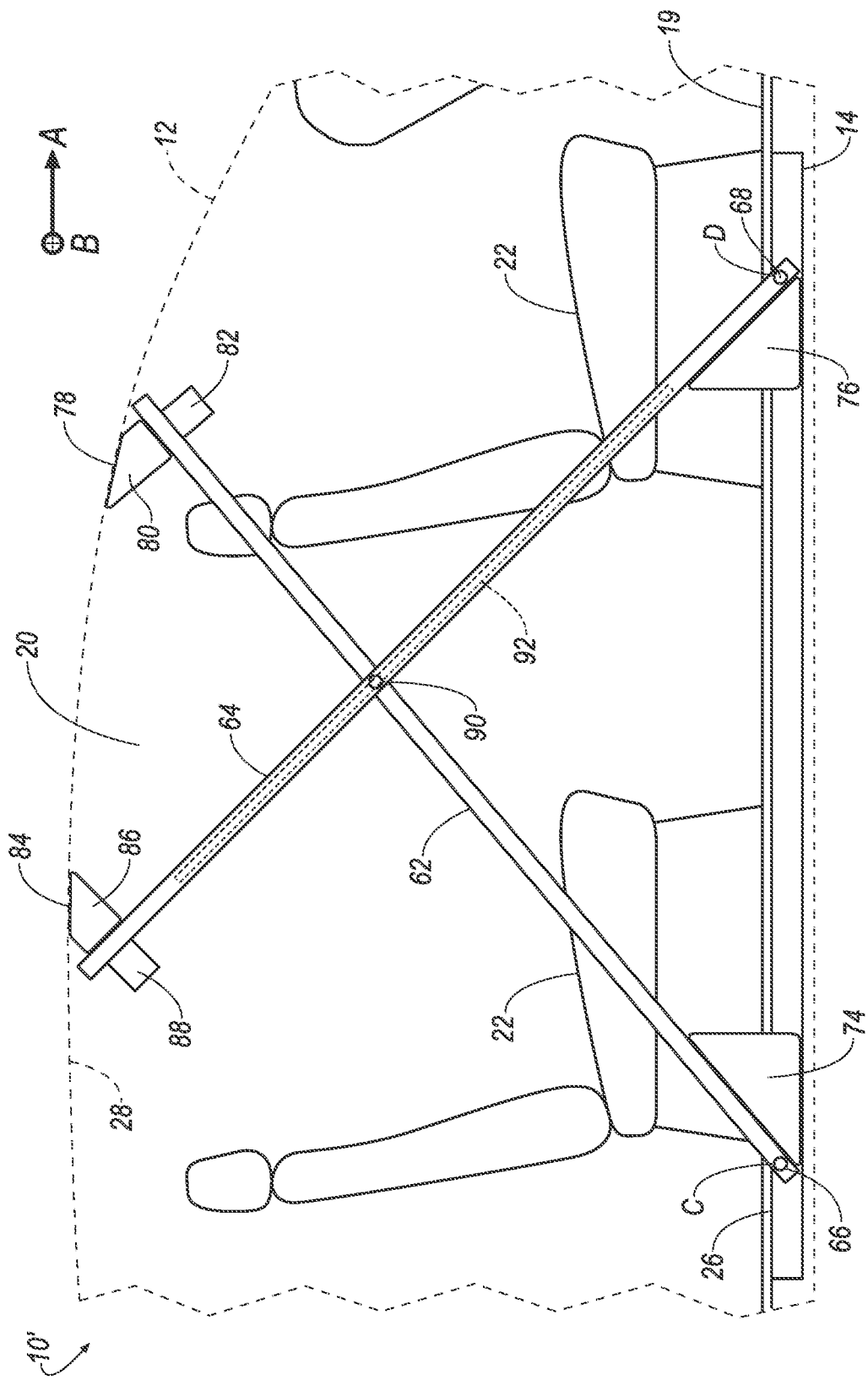
FIG. 8 is a side view of the vehicle of the second embodiment of the impact absorbing system with the reinforcement member in the deployed position.

As shown in FIGS. 6-9, the impact absorbing system 10' includes a second reinforcement member 64. The reinforcement member 62 and the second reinforcement member 64 may each be supported by the rocker 14 and deployable from the undeployed position beneath the vehicle floor 19 to the deployed position above the vehicle floor 19. When in the deployed position, the reinforcement member 62 and the second reinforcement member 64 may have a generally X-shaped position, as shown in FIGS. 6 and 8, increasing an area from which to absorb the impact energy. As shown in FIG. 6, the impact absorbing system 10' may include a third reinforcement member 70 and a fourth reinforcement member 72 disposed on an opposing side of the vehicle 12.

The reinforcement member 62 may be rotatably connected to the rocker 14 with a rotator 66, e.g., a hinge. The rotator 66 may allow the reinforcement member 62 to rotate about a rotator axis C from the undeployed position beneath the vehicle floor 19 to the deployed position above the vehicle floor 19. The second reinforcement member 64 may be connected to the rocker 14 with a second rotator 68 (e.g., a hinge) and rotatable about a second rotator axis D. The rotator axis C and the second rotator axis D may be transverse to the longitudinal axis A of the vehicle, e.g., the rotator axis C and the second rotator axis D may align with the vehicle lateral axis B.

The impact absorbing system 10' may include an airbag 74, as shown in FIGS. 6-8. The airbag 74 may be disposed between the rocker 14 and the reinforcement member 62. The airbag 74 may be inflatable from an uninflated position to an inflated position. The airbag 74 may be arranged to deploy the reinforcement member 62 to the deployed position. That is, when the airbag 74 inflates to the inflated position, the airbag 74 may deploy the reinforcement member to the deployed state, rotating the reinforcement member 62 about the rotator 66. As shown in FIGS. 6-8, the impact absorbing system 10' may include a second airbag 76 disposed between the rocker 14 and the second reinforcement member 64 arranged to deploy the second reinforcement member 64 to the deployed position.

As shown in FIGS. 6-8, the vehicle roof 28 may include a catch 78. The catch 78 may be connected to the vehicle roof 28, as shown in FIGS. 6-8. The reinforcement member 62 may be spaced from the catch 78 in the undeployed position and engaged with the catch 78 when the reinforcement member 62 is in the deployed position. That is, when the reinforcement member 62 deploys to the deployed position, the catch 78 stops the reinforcement member 62, fixing the reinforcement member 62 in the deployed position to absorb energy during the impact. The catch 78 may include a first portion 80 that prevents movement of the reinforcement member 62 about the rotator axis C. The catch 78 may include a second portion 82 inboard relative to the reinforcement member 62 that prevents movement of the reinforcement member 62 toward the vehicle cabin 20. Thus, the first and second portions 80, 82 of the catch 78 prevent movement of the reinforcement member 62 upon deployment to the deployed position. As shown in FIGS. 6-8, the vehicle roof 28 may include a second catch 84 connected to the vehicle roof 28 and arranged to engage the second reinforcement member 64 in the deployed position. The second catch 84 may include a first portion 86 that prevents movement of the second reinforcement member 64 about the second rotator axis D and a second portion 88 that prevents movement of the second reinforcement member 64 toward the vehicle cabin 20. The third and fourth reinforcement members 70, 72 may be received by a third catch 71 and a fourth catch 73, respectively.

As shown in FIGS. 8-9, the reinforcement member 62 and the second reinforcement member 64 may be slidably connected. By slidably connecting the reinforcement member 62 and the second reinforcement member 64, the impact absorbing system 10' can position the reinforcement member 62 and the second reinforcement member 64 to absorb impact energy and prevent interference between the reinforcement member 62 and the second reinforcement member 64 during deployment.

As shown in FIGS. 6-9, the reinforcement member 62 may include a slider 90. The slider 90 may be fixed to the reinforcement member 62. The second reinforcement member 64 may define a slot 92. The slider 90 may be slidably connected to the slot 92. Thus, when the reinforcement member 62 deploys to the deployed position, the slider 90 may engage the slot 92, moving the second reinforcement member 64 to the deployed position. The slider 90 may be, e.g., a pin, a bearing, a post, etc.

Figure 12:
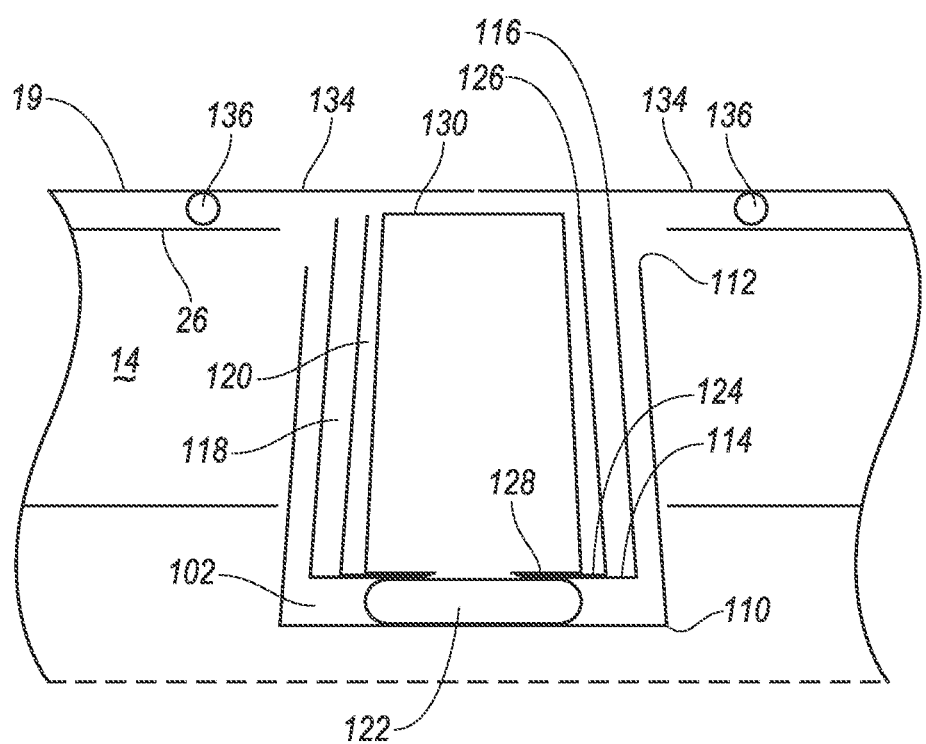
FIG. 12 is a side view of the reinforcement member in the undeployed position.
Figure 13:
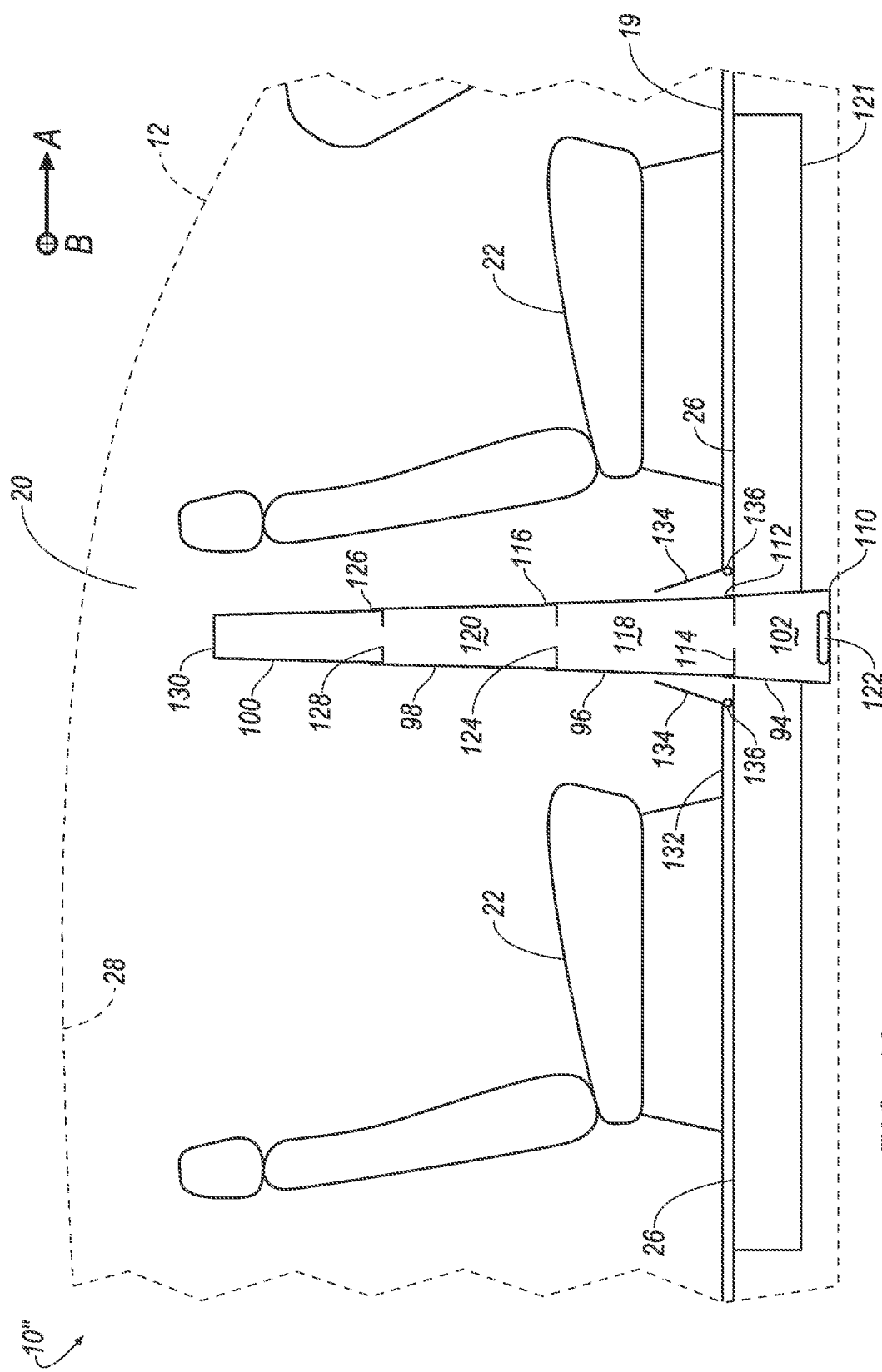
FIG. 13 is a side view of the third embodiment of the impact absorbing system with the reinforcement member in the deployed position.

FIGS. 10-13 illustrate another embodiment of the impact absorbing system 10". The impact absorbing system 10" includes a base 94, a reinforcement member 96, a second reinforcement member 98, and a third reinforcement member 100, each supported by the rocker 14 and deployable from an undeployed position beneath the vehicle floor 19 to a deployed position above the vehicle floor 19. As shown in FIGS. 11-13, the base 94 may be fixed to the rocker 14 and may telescopically house the reinforcement member 96, the second reinforcement member 98, and the third reinforcement member 100. That is, as shown in FIG. 12, the base 94 may define a base chamber 102 and the reinforcement member 96, the second reinforcement member 98, and the third reinforcement member 100 may be disposed in the base chamber 102 in the undeployed position. As shown in FIG. 10, the impact absorbing system 10" may include a second base (not shown), a fourth reinforcement member 104, a fifth reinforcement member 106, and a sixth reinforcement member 108 disposed on an opposite side of the vehicle 12.

The base 94 may taper from a first edge 110 to a second edge 112, as shown in FIG. 12. That is, the base 94 may be shaped so that a cross-sectional area defined by the first edge 110 is larger than a cross-sectional area defined by the second edge 112. The reinforcement member 96 may be telescopically received by the base 94. That is, the reinforcement member 96 may taper from a first edge 114 to a second edge 116. The reinforcement member 96 may be shaped so that a cross-sectional area defined by the first edge 114 is smaller than the cross-sectional area defined by the second edge 112 of the base 94. The reinforcement member 96 may be wedged with the base 94 when the reinforcement member 96 is in the deployed position, as shown in FIG. 12. That is, when the reinforcement member 96 deploys to the deployed position, the first edge 114 of the reinforcement member 96 may create a friction fit with the second edge 112 of the base 94, wedging the reinforcement member 96 to the base 94.

As shown in FIG. 12, the reinforcement member 96 may define a chamber 118. The second reinforcement member 98 may be disposed in the chamber 118 when the reinforcement member 96 and the second reinforcement member 98 are in the undeployed position, as shown in FIG. 10. The second reinforcement member 98 may define a second chamber 120, and the third reinforcement member 100 may be disposed in the second chamber 120 when the second reinforcement member 98 and the third reinforcement member 100 are in the undeployed position, as shown in FIG. 10. Thus, the reinforcement member 96, the second reinforcement member 98, and the third reinforcement member 100 may extend up through the vehicle floor 19 to the deployed position to absorb energy during the impact, as shown in FIGS. 10 and 13.

The impact absorbing system 10" may include an actuator 122. As described above, the actuator 122 may be a pyrotechnic inflator. The actuator 122 may be disposed in the base 94 and may be in fluid communication with the reinforcement member 96, the second reinforcement member 98, and the third reinforcement member 100. Upon actuation, the actuator 122 may generate an inflation medium, increasing pressure in the base chamber 102 and may move the reinforcement member 96, the second reinforcement member 98, and the third reinforcement member 100 to the deployed position above the vehicle floor 19, as shown in FIG. 13. The inflator may be, for example, a pyrotechnic inflator that uses a chemical reaction to drive inflation medium to the airbag. The inflator may be of any suitable type, for example, a cold-gas inflator.

As described above and shown in FIGS. 11-12, the reinforcement member 96 may taper from the first edge 114 to the second edge 116. The reinforcement member 96 may be shaped so that a cross-sectional area defined by the first edge 114 is larger than a cross-sectional area defined by the second edge 116. The second reinforcement member 98 may be telescopically received by the reinforcement member 96. That is, the second reinforcement member 98 may taper from a first edge 124 of the second reinforcement member 98 to a second edge 126 of the second reinforcement member 98. The second reinforcement member 98 may be shaped so that a cross-sectional area defined by the first edge 124 is smaller than the cross-sectional area defined by the second edge 116 of the reinforcement member 96. The second reinforcement member 98 may be wedged with the reinforcement member 96 when the reinforcement member 96 and the second reinforcement member 98 are in the deployed position. That is, when the second reinforcement member 98 deploys to the deployed position, the first edge 124 of the second reinforcement member 98 may create a friction fit with the second edge 116 of the reinforcement member 96, as shown in FIG. 13, wedging the second reinforcement member 98 to the reinforcement member 96.

The third reinforcement member 100 may be telescopically received by the second reinforcement member 98, as shown in FIGS. 10-13. The third reinforcement member 100 may taper from a first edge 128 of the third reinforcement member 100 to a second edge 130 of the third reinforcement member 100. The third reinforcement member 100 may be shaped so that a cross-sectional area defined by the first edge 128 is smaller than the cross-sectional area defined by the second edge 126 of the second reinforcement member 98. Thus, when the third reinforcement member 100 deploys to the deployed position, the first edge 128 of the third reinforcement member 100 may create a friction fit with the second edge 126 of the second reinforcement member 98. When the actuator 122 deploys the reinforcement member 96, the second reinforcement member 98, and the third reinforcement member 100 to the deployed position, the second and third reinforcement members 98, 100 may create friction fits, i.e., may be wedged, with the reinforcement member 96 and the second reinforcement member 98, respectively, securing the reinforcement member 96, the second reinforcement member 98, and the third reinforcement member 100 to absorb impact energy.

As described above and shown in FIGS. 10 and 13, the reinforcement member 96 may extend through the vehicle floor 19. That is, the vehicle floor 19 may include a main panel 132 and a plurality of cover panels 134. The cover panels 134 may be rotatably connected to the main panel 132 with a rotator 136, e.g., a hinge, as shown in FIGS. 11-13. The cover panels 134 may be disposed above the reinforcement member 96 in the undeployed position, as shown in FIG. 10. When the actuator 122 is triggered, the third reinforcement member 100 may push against the cover panels 134, rotating the cover panels 134 away from the third reinforcement member 100 and allowing the reinforcement member 96, the second reinforcement member 98, and the third reinforcement member 100 to move above the cover panels 134 and the main panel 132 to the deployed position. Alternatively, the vehicle floor 19 may include a tear seam (not shown, and the third reinforcement member 100 may tear the tear seam from beneath the tear seam as the third reinforcement member 100 moves to the deployed position.

Figure 14:
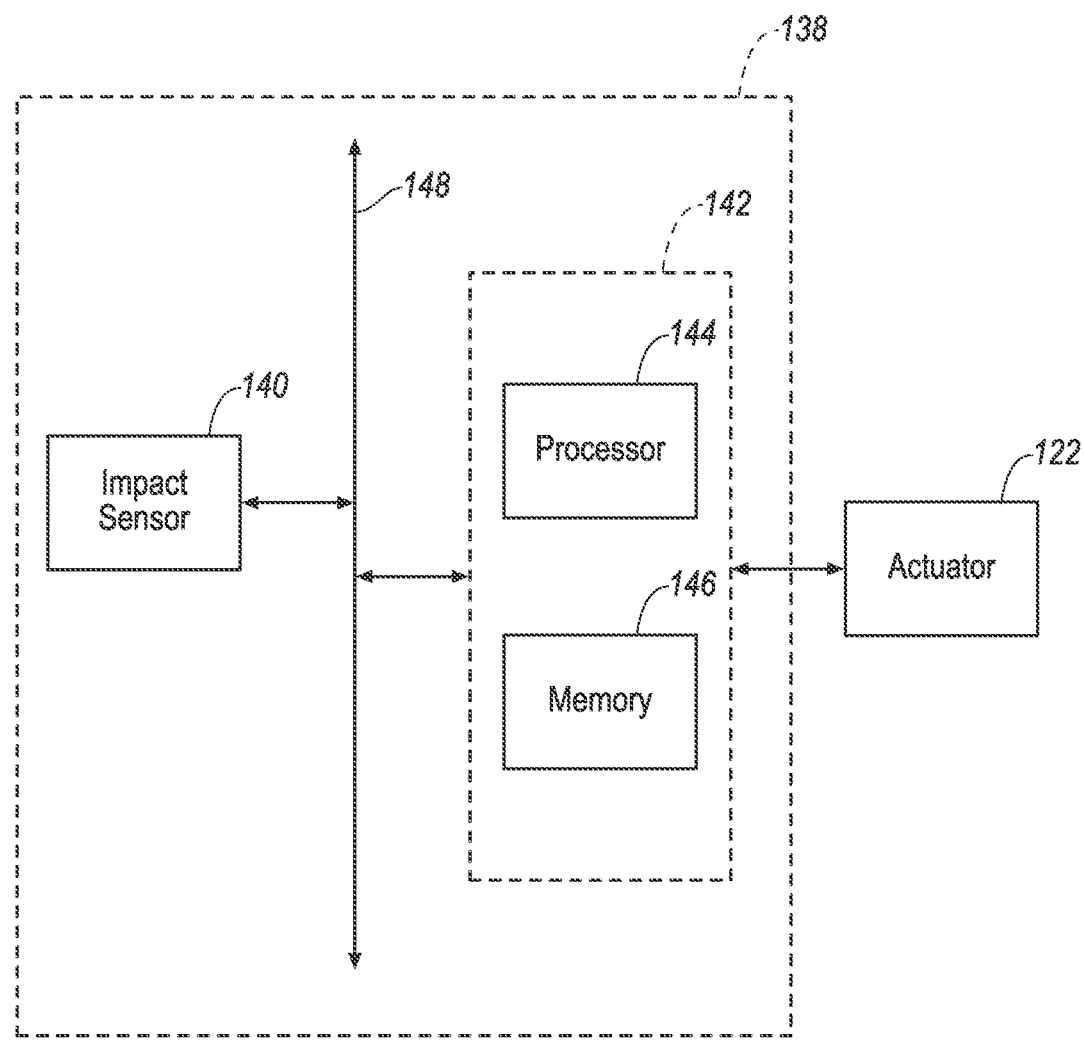
FIG. 14 is a block diagram of an impact sensing system.

With reference to FIG. 14, the vehicle may include an impact sensing system 138. The impact sensing system 138 may include an impact sensor 140 and a controller 142. The controller 142 is in communication with the actuator 122 and may include a processor 144 and a memory 146. The actuator 122 may be an inflator programmed to inflate the airbag 30, 74. The memory 146 stores instructions executable by the processor 144 to control the actuator 122. The controller 142 may be programmed to, upon identification of an impact, cause triggering of the actuator 122, causing the actuator 122 to generate the inflatable medium and deploy the reinforcement member 21, 62, 96.

The impact sensor 140 may be in communication with the controller 142 to communicate data to the controller 142. The impact sensor 140 may use e.g., accelerometers, radar, lidar, and/or a vision system. The vision system may include one or more cameras, CCD image sensors, and/or CMOS image sensors, etc. Based on data communicated by the impact sensor 140, the controller 142 may cause triggering of the actuator 122.

To facilitate communications, the controller 142, the impact sensor 140, the actuator 122, and other components in the vehicle 12 may be connected to a communication bus 148, such as a controller area network (CAN) bus, of the vehicle 12. The controller 142 may use information from the communication bus 148 to control the triggering of the actuator 122. The actuator 122 may be connected to the controller 142 or may be connected to the communication bus 148.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An impact absorbing system comprising:
a vehicle floor;
a rocker disposed below the vehicle floor;
a floor pan connected to the rocker; and
a reinforcement member supported on the rocker and deployable from an undeployed position in which the reinforcement member is disposed between the floor pan and the vehicle floor to a deployed position above the vehicle floor.

2. The impact absorbing system of claim 1, further comprising an airbag disposed beneath the reinforcement member and inflatable to an inflated position.

3. The impact absorbing system of claim 2, wherein the airbag is positioned to move the reinforcement member to the deployed position when the airbag inflates to the inflated position.

4. The impact absorbing system of claim 1, further comprising a second reinforcement member supported by the rocker and deployable from an undeployed position beneath the vehicle floor to a deployed position above the vehicle floor.

5. The impact absorbing system of claim 4, further comprising a slider fixed to the reinforcement member, wherein the second reinforcement member includes a slot and the slider is slidably connected to the slot.

6. The impact absorbing system of claim 4, wherein the second reinforcement member is telescopically received in the reinforcement member in the undeployed position.

7. The impact absorbing system of claim 6, wherein the reinforcement member has a chamber tapering from a first end to a second end, and wherein the second reinforcement member telescopically extends from the second end in the deployed position.

8. The impact absorbing system of claim 6, further comprising a third reinforcement member telescopically received in the second reinforcement member in the undeployed position.

9. The impact absorbing system of claim 1, further comprising a support member rotatably connected to the reinforcement member and a groove in the vehicle floor, wherein the support member is slidably connected to the groove.

10. The impact absorbing system of claim 9, further comprising a post movable from an undeployed position below the groove to a deployed position above the groove, wherein when the reinforcement member is in the deployed position and the post is in the deployed position, the support member is fixed between the reinforcement member and the post.

11. The impact absorbing system of claim 1, wherein the reinforcement member tapers from a first edge of the reinforcement member to a second edge of the reinforcement member.

12. The impact absorbing system of claim 1, further comprising a vehicle roof and a catch connected to the vehicle roof, wherein the reinforcement member is spaced from the catch in the undeployed position and engaged with the catch in the deployed position.

13. The impact absorbing system of claim 1, wherein the reinforcement member is rotatably connected to the rocker.

14. The impact absorbing system of claim 1, further comprising an actuator designed to move the reinforcement member to the deployed position.

15. An impact absorbing system comprising:
an impact sensor;
a rocker disposed below a vehicle floor;
a floor pan connected to the rocker;
a reinforcement member supported by the rocker and deployable from an undeployed position in which the reinforcement member is disposed between the floor pan and the vehicle floor to a deployed position; and
an actuator in communication with the impact sensor;
wherein the actuator is programmed to deploy the reinforcement member when the impact sensor detects an impact.

16. The impact absorbing system of claim 15, wherein, when the reinforcement member is in the deployed position, the reinforcement member is above the rocker.

17. The impact absorbing system of claim 15, further comprising a second reinforcement member supported by the rocker and deployable from an undeployed position to a deployed position.

18. The impact absorbing system of claim 17, wherein the second reinforcement member is telescopically received in the reinforcement member in the undeployed position.

19. The impact absorbing system of claim 15, wherein the actuator is programmed to inflate an airbag.

* * * * *